(12) United States Patent
Maragioglio

(10) Patent No.: US 12,055,201 B2
(45) Date of Patent: Aug. 6, 2024

(54) METHOD FOR OPERATING A TRAIN SYSTEM FOR A MECHANICAL DRIVEN EQUIPMENT

(71) Applicant: NUOVO PIGNONE TECNOLOGIE—SRL, Florence (IT)

(72) Inventor: Gaspare Maragioglio, Florence (IT)

(73) Assignee: Nuovo Pignone Tecnologie—SRL, Florence (IT)

( * ) Notice: Subject to any disclaimer, the term of this patent is extended or adjusted under 35 U.S.C. 154(b) by 0 days.

(21) Appl. No.: 18/042,709

(22) PCT Filed: Aug. 25, 2021

(86) PCT No.: PCT/EP2021/025321
§ 371 (c)(1),
(2) Date: Feb. 23, 2023

(87) PCT Pub. No.: WO2022/042885
PCT Pub. Date: Mar. 3, 2022

(65) Prior Publication Data
US 2023/0341028 A1   Oct. 26, 2023

(30) Foreign Application Priority Data
Aug. 28, 2020 (IT) .......... 102020000020596

(51) Int. Cl.
*F16H 3/72* (2006.01)
*F01D 15/10* (2006.01)
(Continued)

(52) U.S. Cl.
CPC ............ *F16H 3/724* (2013.01); *F01D 15/10* (2013.01); *F01D 15/12* (2013.01); *F02C 7/36* (2013.01);
(Continued)

(58) Field of Classification Search
CPC .. F16H 3/724; F16H 2001/2881; F01D 15/10; F01D 15/12; F05D 2220/76; F05D 2260/4031
(Continued)

(56) References Cited

U.S. PATENT DOCUMENTS

| 3,307,426 A | 1/1960 | Whitaker |
| 6,715,291 B1 * | 4/2004 | Liao ........................ B60L 50/16 475/5 |

(Continued)

FOREIGN PATENT DOCUMENTS

| DE | 10 2015 002585 A1 | 9/2016 |
| GB | 2429342 A | 2/2007 |

(Continued)

*Primary Examiner* — Sherry L Estremsky
(74) *Attorney, Agent, or Firm* — Paul Frank + Collins P.C.

(57) ABSTRACT

A method of operating a train system for driving a mechanical driven equipment is disclosed. The train system comprises a hybrid gearbox connected between a power source and a load to be driven. The hybrid gearbox includes a lay shaft gear, which transmission ratio between the power source and the load and a motor-generator unit can be adjusted, to adjust the transmission speed ratio arranged, to balance the power generated by the power source and to improve the efficiency of the train system in a number of operating conditions.

13 Claims, 6 Drawing Sheets

(51) Int. Cl.
   *F01D 15/12*     (2006.01)
   *F02C 7/36*      (2006.01)
(52) U.S. Cl.
   CPC ......... *F16H 3/725* (2013.01); *F05D 2220/76* (2013.01); *F05D 2260/4031* (2013.01); *F05D 2270/06* (2013.01)
(58) Field of Classification Search
   USPC ...................................................... 475/339, 5
   See application file for complete search history.

(56) References Cited

U.S. PATENT DOCUMENTS

| | | | | |
|---|---|---|---|---|
| 6,895,741 | B2 * | 5/2005 | Rago | F02C 7/36 60/793 |
| 7,037,230 | B2 * | 5/2006 | Dupriez | F16H 3/72 180/65.265 |
| 7,865,287 | B2 * | 1/2011 | Huseman | B60K 6/445 180/65.265 |
| 10,180,178 | B2 * | 1/2019 | Boiger | F16H 3/727 |
| 11,085,524 | B2 * | 8/2021 | Boiger | F16H 57/10 |
| 2005/0014600 | A1 | 1/2005 | Clauson | |
| 2006/0250902 | A1 * | 11/2006 | Bender | B60L 50/62 369/1 |
| 2014/0378257 | A1 | 12/2014 | White | |
| 2016/0025192 | A1 | 1/2016 | Kennedy | |

FOREIGN PATENT DOCUMENTS

| | | | | |
|---|---|---|---|---|
| GB | 2611446 | A | 4/2023 | |
| WO | WO-2021248154 | A1 * | 12/2021 | ............... B60K 1/02 |

\* cited by examiner

METHOD FOR OPERATING A TRAIN SYSTEM FOR A MECHANICAL DRIVEN EQUIPMENT

TECHNICAL FIELD

The present disclosure concerns a method for operating a drive arrangement to drive a mechanically driven equipment in a train system.

BACKGROUND ART

Mechanical driven equipment or loads, such as pumps or compressors, are driven by appropriate power sources. Among these power sources can be mentioned gas turbines, steam turbines, expanders, diesel engines, gas engines, or electric motors.

In general, there are available in the market systems, called "trains", "train systems" or similar, where a power source drives a load, such as one or more compressors, pumps, or ship propellers, through transmission equipment. More specifically, the transmission of the power from the power source to the mechanically driven equipment (or load) takes place through an input shaft, which the power source is connected to, an output shaft, connected to the load L, and a gearbox to change the transmission ratio between the speed of the input shaft (namely of the power source) and the output shaft (namely of the load). Hereafter, for ease of reference only, a system comprising a power source, a gearbox, and a load, e.g. a compressor, may be referred to as a "train", a "train system" or a "train plant".

The gearbox can be of different types, and in particular, it can be fixed or variable gear ratio type.

In general, changing the speed of driven equipment in several circumstances is necessary. Therefore, if a fixed transmission ratio is used in a system, it is usually required that the driver equipment, i.e. the power source, is capable of changing the rotational speed of the transmission input shaft. In this case, the only possible drivers or power sources can be a Variable Frequency Drive (VFD) electric motor, a double-shaft gas turbine, a steam turbine, an expander, a diesel engine, or a gas engine, for instance. In fact, these kinds of power sources can vary the speed. However, these systems turn out to be complex from the technical point of view, since it is necessary to equip the plant with large frequency converters, for electric motors, or to increase the mechanical complexity of power sources.

Additionally, in case the driver is an electric motor with VFD, the train system can experience sub-synchronous torsional interactions, which can be transferred to other train systems, such as generator drive or mechanical drive trains, through network disturbances. In this case the train system is not optimized in terms of CAPEX (footprint and weight) and OPEX (efficiency).

If a variable-transmission-ratio gearbox is used, a fixed speed electric motor or a single-shaft shaft gas turbine can be used as power source. Train systems equipped with variable gear ratio gearbox usually comprise epicyclic type or derived gearboxes. This type of gearboxes generally includes an annulus wheel, a plurality of star wheels, meshed with the annulus wheel, held together by a star carrier, and a sun wheel, in its turn meshed with the star wheels. The transmission ratio of a variable gear ratio epicyclic gearbox can be varied by varying the rotational speed of the star carrier with respect to the annulus wheel or vice versa, by varying the rotational speed of the annulus wheel with respect to the star carrier, respectively assuming that the transmission input shaft is coupled to the annulus wheel or to the star carrier. The use of a variable gear ratio gearbox allows for greater design flexibility. As alternative to the epicyclic type gear a layshaft gear arrangement can be used to realize a variable-transmission-ratio gearbox, this including an input sun wheel, a plurality of star wheels, meshed with the input sun wheel, held together by a star carrier, and an output sun wheel, in its turn meshed with the star wheels.

In a train system that provides a gas turbine as driver, in case of direct mechanical connection through a fixed speed ratio transmission to the load during the start-up of the gas turbine, part of the torque is transferred to the transmission output shaft, which the load is connected to. This entails the need for the gas turbine to bear a load resistance at the start-up, which implies the impossibility to use single shaft gas turbines due to their torque output limitations during the start-up. To prevent this kind of problem, usually, one or more clutches or large starter equipment such as electric motors, steam turbines or expanders are provided, which necessarily increase the cost of the plant, as well as efficiency losses.

Also, in a train system that provides an electric motor as a driver, in case of direct mechanical connection through a fixed speed ratio transmission to the load, at the start-up phase, the electric motor bears the load resistance, given by its inertia. Thus, it is necessary to use motors with a greater power to cope with the power peak needed during the start-up phase. This entails an increase of the train plant cost. Also, in this case, the only alternative to a higher power electric motor is the use of one or more clutches in the transmission chain.

Therefore, it is felt the need of an improved variable speed ratio transmission capable of disconnecting the driven equipment from the driver during the driver start-up sequences, to realize no-load starts-up, and then able to synchronize the driven equipment speed from stand-still to the driver, which is already at its nominal speed, to allow train arrangement flexibility and, at the same time, capable to control the driven equipment speed to cover any operating condition.

SUMMARY

In one aspect, the subject matter disclosed herein is directed to a method for controlling the operation of motor generator units and a layshaft gear arrangement, which can be a speed reducer or a speed increaser, with two sun wheel shafts, three or more compound star wheel shafts, and a star carrier, to disconnect the driven equipment from the driver during the driver start-up sequences, to realize no-load starts-up, and then able to synchronize the driven equipment speed from stand-still while the driver speed is running at its nominal speed. The star carrier speed is controlled by a motor-generator unit (also called speed ratio motor-generator unit—MGU), which acts as a continuous controlled variable torque system (CCVT). By changing the star carrier speed, the gear input/output speed ratio can be continuously changed.

An additional motor-generator unit (called power balance motor-generator unit—MGU) can be present or not, to hold the gear output shaft and thus allow the speed ratio motor-generator unit to start-up a power source, such as a single-shaft gas turbine, a synchronous electric motor, a diesel engine, a gas engine or to keep the power sources running to cover transient operating conditions like idle, crank, online water wash, cooldown.

The method for controlling the mentioned power balance motor-generator unit will allow to keep the power sources, like single and double shaft gas turbines or steam turbines or diesel engines or a gas engine, running at their maximum efficiency conditions, thus enabling gas/electric or steam/electric or diesel/electric power balance based on energy availability and cost, thus covering for instance gas turbines power surplus/deficit based on ambient conditions (winter/summer or night/day ambient temperature variation), thus enabling electric energy storage in battery systems to build spinning reserve.

In an aspect, the subject matter disclosed herein concerns a drive arrangement connected between a power source and an equipment or load to be driven. The drive arrangement comprises a hybrid gearbox, having a layshaft gearbox comprising a star carrier, configured to adjust the transmission speed ratio between the power source and the driven equipment. The hybrid gearbox also comprises a speed ratio motor-generator unit. The operating method allows to control the rotation of the star carrier.

A further aspect of the present disclosure is drawn to a method for operating a train system with a power source, a drive arrangement and a load (driven equipment). It comprises the steps of operating the speed ratio motor-generator unit to adjust the rotational speed of a star carrier, to set the transmission speed ratio of the layshaft gearbox so as to adjust the speed and the torque at the output shaft of the drive arrangement.

In another aspect, disclosed herein is a train system having a single-shaft gas turbine as power source, wherein the speed ratio motor-generator unit rotates the star carrier to set the transmission ratio such that the speed rotation of the output shaft is zero at the start-up phase of the power source, or such that, when the speed ratio motor-generator unit is switched-off the star carrier rotate at the free spinning mode to set the transmission ratio such that the speed rotation of the output shaft is zero at the start-up phase of the power source.

In another aspect, disclosed herein is method for operating a train system having a power source, like single and double shaft gas turbine or steam turbine or diesel engine, or a gas engine, wherein part of the power transmitted to the driven equipment is recovered and transformed in electric energy to be injected in an electricity grid or battery packs by a power balance motor-generator unit, thus keeping the power sources running at max efficiency, enabling to minimize the $CO_2$ production per equivalent overall output and enabling to build spinning reserve.

In another aspect, disclosed herein is method for operating a train system having a power source, like single and double shaft gas turbines, wherein a power balance motor-generator unit is operated to compensate gas turbines power surplus/deficit based on ambient conditions (winter/summer or night/day ambient temperature variation), thus enabling to build or use spinning reserve.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS

In mechanically driven equipment, a power source, such as a gas turbine, an electric motor, a diesel engine, a gas engine and the like, has to be connected to a load. The connection takes place by a transmission system, which can vary its transmission speed ratio, to vary the driven equipment speed, according to any possible operating circumstances, such as at the startup phase. The transmission system comprises a variable transmission gearbox. The transmission speed ratio of the variable speed gearbox is adjusted by a motor-generator unit, integrated in an annular way with the star carrier of the variable speed gearbox, which can be operated either as a motor or as a generator, to adjust the speed ratio of the gearbox thus allowing the decoupling of the power source from the load, until the power source itself reaches the so called crank speed, preventing any nonlinear power transmission during the above mentioned startup phase.

Figure 1:
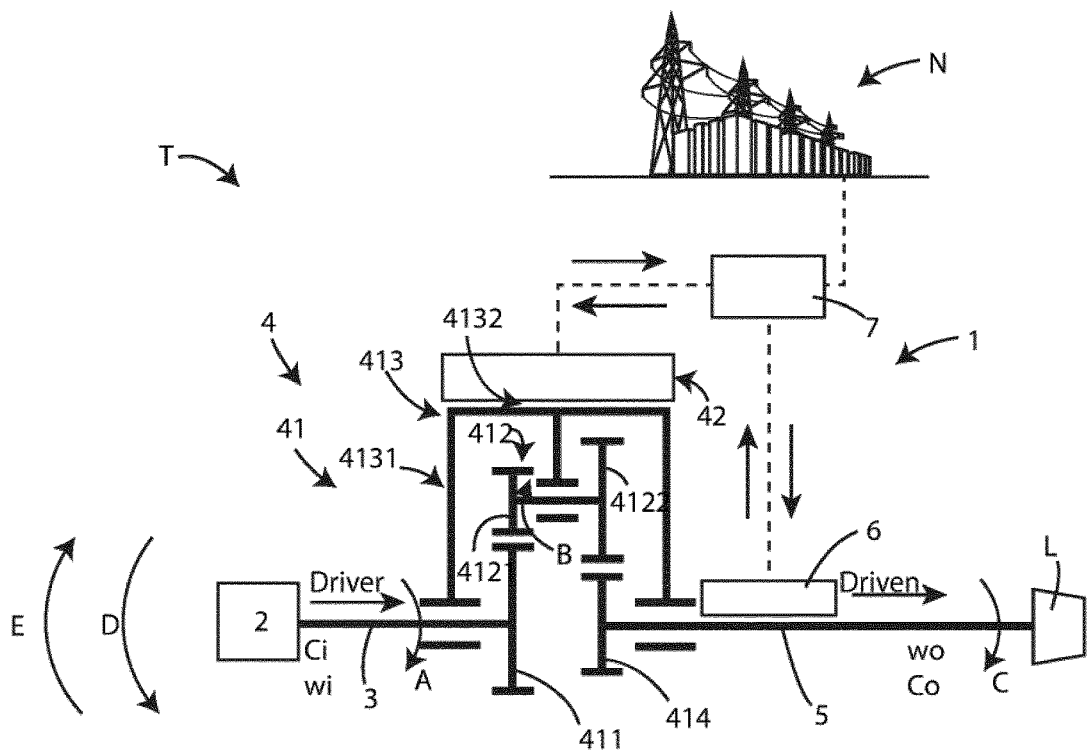
FIG. 1 illustrates a schematic of a scheme of a drive arrangement according to a first embodiment.

Referring now to the drawings, FIG. 1 shows a train system T according to a first embodiment, wholly indicated with reference number 1, to be operated with the operating method according to the present disclosure.

In particular, the train system T comprises a power source 2, a drive arrangement 1, connected through an input shaft 3 to the power source 2, and a load L, in its turn connected to the drive arrangement 1 through an output shaft 5. Also, the drive arrangement 1 comprises a hybrid gearbox 4, configured to transmit the torque from the input shaft 3 to the output shaft 5.

The drive arrangement 1 also comprises a control unit 7, which is a computer, and a power balance motor-generator unit 6, which is associated with the output shaft 5. The control unit 7 is operatively connected to the hybrid gearbox 4, and to the second motor-generator unit 6, to adjust the power transmitted to the load L, in terms of torque $C_o$ and rotational speed $\omega_o$. Furthermore, the control unit 7 is connectable to an electricity grid or battery packs N, as better explained below.

The power source 2 can be of any type used in the field of mechanically driven equipment. In particular, it can be a gas turbine, of double-shaft type, thus capable of varying its rotation speed, or single-shaft type, thus operating at a fixed speed. Alternatively, the power source 2 can also be an electric motor, a steam turbine, an expander, a diesel engine, or a gas engine. The power source 2 is capable of delivering a torque, indicated with $C_i$ to rotate the input shaft 3 at a rotational speed $\omega_i$.

The hybrid gearbox 4 comprises a layshaft gearbox 41 and a speed ratio motor-generator unit 42. The structure of the embodiment of the layshaft gearbox 41 is described in the following. Then an embodiment as to how the speed ratio motor-generator unit 42 is associated with the layshaft gearbox 41 and operates it is also disclosed.

Figure 2:
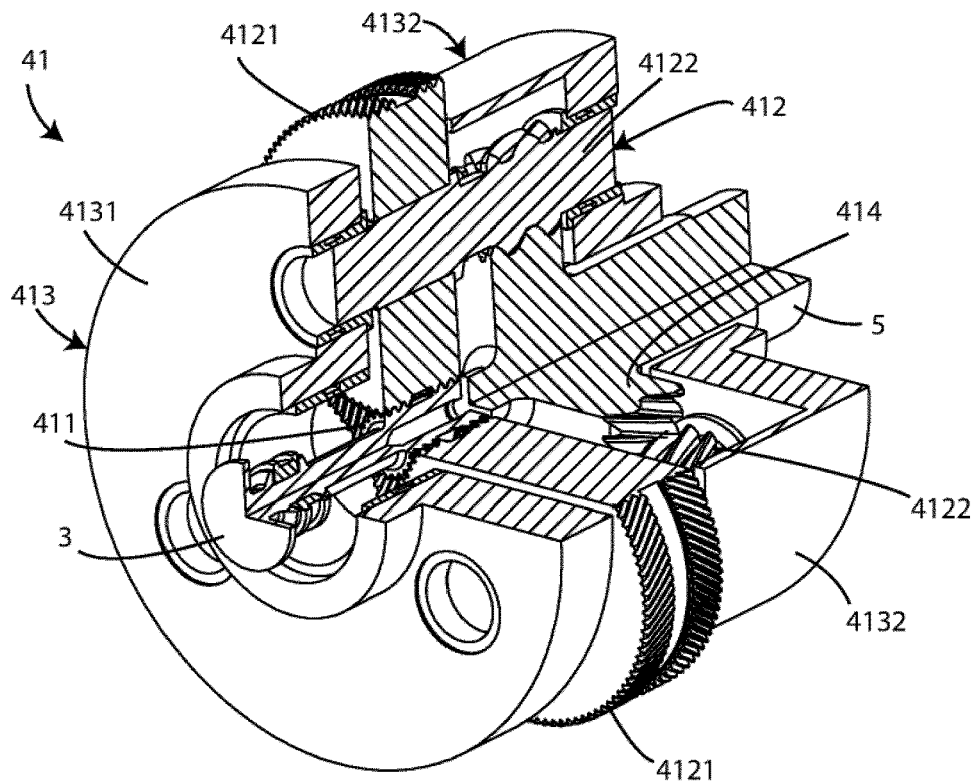
FIG. 2 illustrates a perspective view of a layshaft gearbox according to the present disclosure.
Figure 3:
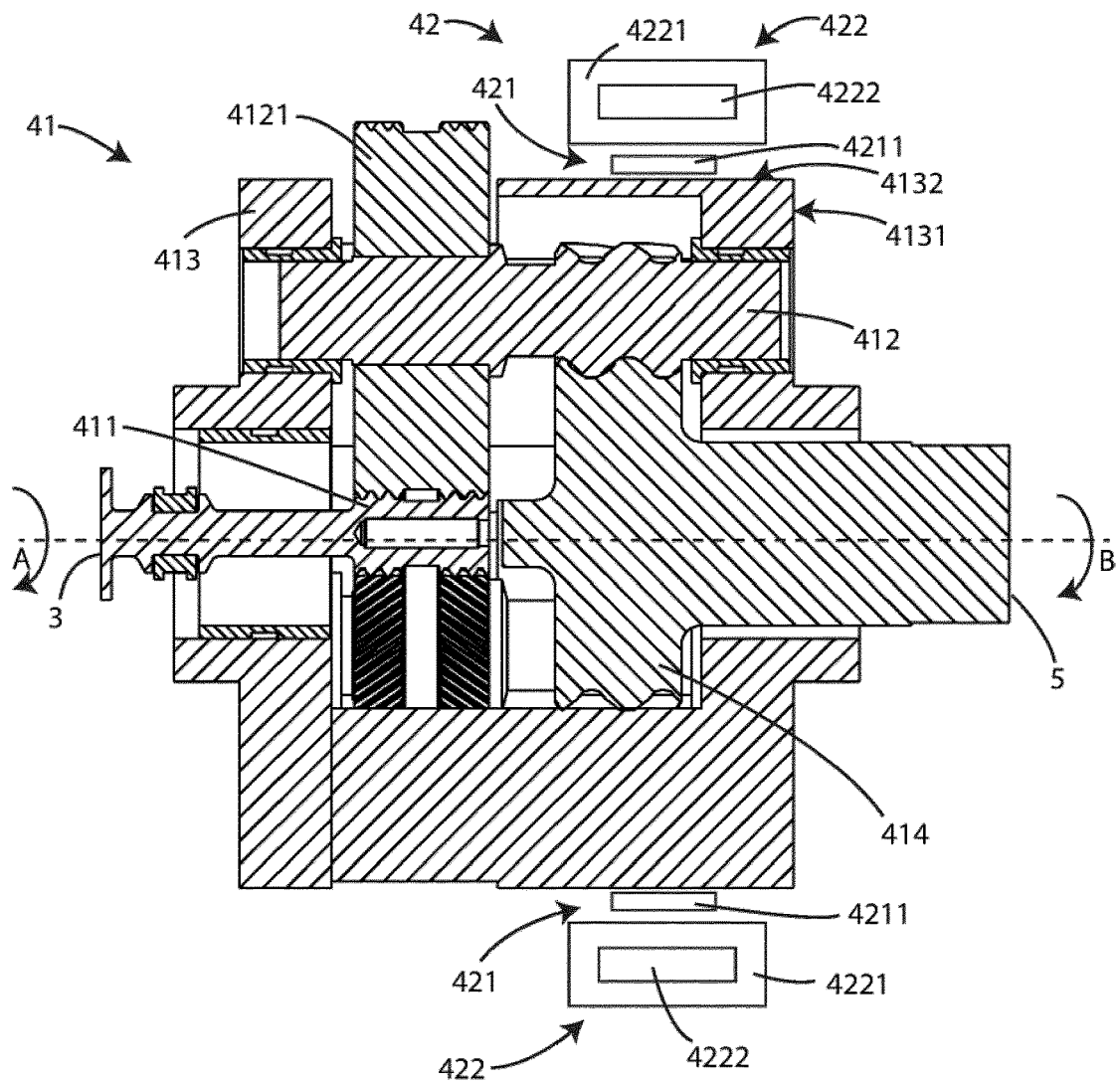
FIG. 3 illustrates a longitudinal sectional view of the layshaft gearbox of FIG. 2.

Referring also to FIG. 2 and FIG. 3, it is observed that the layshaft gearbox 41 comprises an input sun wheel 411, connected to the input shaft 3, and two or more (usually three) compound star wheel shafts 412, each one having a first gear stage 4121, meshed with the input sun wheel 411, and a second gear stage 4122. The layshaft gearbox 41 also comprises a star carrier 413, having a body 4131, on which an outside diametral surface 4132 is obtained, which function will be better explained in the following.

The body 4131 of the star carrier 413 houses the input sun wheel 411 and the compound star wheel shafts 412. Each compound star wheel shaft 412 is pivoted about the body 4131 of the star carrier 413.

The layshaft gearbox 41 comprises also an output sun wheel 414, connected to the output shaft 5, and meshed with the second gear stage 4122 of each compound star wheel shafts 412. The output sun wheel 414 is also housed within the body 4131 of the star carrier 413.

In the embodiment illustrated in FIG. 3, the speed ratio motor-generator unit 42 is a perimetral low voltage electric machine, arranged on the outside diametral surface 4132 of the body 413 of the layshaft gearbox 41. In particular, the speed ratio motor-generator unit 42 is annularly arranged around the body 413 of the layshaft gearbox 41. Continuing referring also to FIG. 3, the speed ratio motor-generator unit 42 comprises a rotor 421, arranged on the outside diametral surface 4132 of the body 413 of the layshaft gearbox 41, and a stator 422, arranged around the rotor 421, and therefore around the outside diametral surface 4132 of the body 413 of the layshaft gearbox 41.

In the embodiment illustrated in FIG. 3, the rotor 421 comprises or is constituted of a plurality of permanent magnets 4211, installed on the outside diametral surface 4132. In other embodiments, the rotor 421 may be realized by windings.

Also, in the embodiment illustrated in FIG. 3 the stator 422 comprises a stator core 4221 and a winding 4222. As can be seen from the longitudinal section of FIG. 3, the stator 422 surrounds the rotor 421.

The embodiment of the speed ratio motor-generator unit 42 of FIG. 3 is particularly compact. However, in another embodiments, the speed ratio motor-generator unit 42 can be arranged in a different position with respect to layshaft gearbox 41, and connected thereto by a suitable shaft.

In operation, by the speed ratio motor-generator unit 42 is possible rotating (or controlling the rotation) of the star carrier 413, with respect to the input sun wheel 411 and the output sun wheel 414, thus, adjusting the rotation speed coo and the torque $C_o$ of the output shaft 5, which is connected, as said above, to the output sun wheel 414.

Since the speed ratio motor-generator unit 42 is arranged directly around the star carrier 413, high compactness of the assembly is obtained. Furthermore, as can be seen, the layshaft gearbox 41 is not blocked, but its movement is controlled, namely, the relative rotation with respect to the input 3 or the output 5 shaft, by means of the speed ratio motor-generator unit 42. Furthermore, since the layshaft gearbox 41, or more precisely the star carrier 413, is not blocked, it is possible not to transmit the torque to the output shaft 5 when the speed ratio motor-generator unit 42 is switched-off, so that the power source 2 does not encounter any resistant torque of the load L. As will be seen below, this aspect avoids the insertion of clutches in the kinematic chain and allows high design freedom.

The speed ratio motor-generator unit 42 is a low voltage motor-generator unit that can operate both as an electric motor and as a generator, as disclosed above, to control the rotation of the star carrier 413. When the speed ratio motor-generator unit 42 is in generator mode, the drive arrangement 1 is delivering electric current to a grid N or battery systems recovering part of the driver output power, according to the following balance equation $$C_i\omega_i = C_c\omega_c + C_o\omega_o$$

Where $C_c$ and $\omega_c$ are the torque and the rotation speed respectively, and their product is the power delivered to the grid N or the battery pack.

When the speed ratio motor-generator unit 42 is in motor mode, the drive arrangement 1 is absorbing electric current from a grid or battery systems superimposing its power to the driver output power, according to the following equation:

$$C_i\omega_i + C_c\omega_c = C_o\omega_o$$

The control unit 7 is connected to the speed ratio motor-generator unit 42 and controls and adjusts its rotation. In particular, as will be better described below, by adjusting the rotation of the star carrier 413 by means of the speed ratio motor-generator unit 42, the torque and speed transmitted to the load L can be adjusted accordingly.

The drive arrangement 1 includes, as mentioned above, the power balance motor-generator unit 6, which is an electric motor associated with the output shaft 5, to adjust its rotation. The power balance motor-generator unit 6 can be of various types. In embodiments, the power balance motor-generator unit 6 comprises or is constituted of a plurality of permanent magnets 4211, installed on the outside diametral surface of the output shaft 5, or it can be of the same speed ratio motor-generator unit 42 technology.

Also, the power balance motor-generator unit 6 is a low voltage motor-generator machine capable of operating either as an electric motor, thus acting on the movement of the output shaft 5, or as a generator, thus absorbing (at least part of) the power on the input shaft 3, thus generating electric current. The operation shift from electric motor or generator of the power balance motor-generator unit 6 is controlled by the control unit 7, as better defined below.

To describe the operation of the drive arrangement 1, the operation of the hybrid gearbox 4 of FIG. 1, FIG. 2, and FIG. 3 will be described, and the whole operation of the drive arrangement 1 will be described in different design configurations.

The operation of the hybrid gearbox 4 is as follows. Referring to FIG. 1 or FIG. 3, if the star carrier 413 is held still, the speed ratio motor-generator unit 42, when the input shaft rotates in one direction, such as the direction indicated with the arrow A, the first gear stage 4121 and the second gear stage 4122 of the compound star wheel shafts 412 rotate in the opposite direction indicated with the arrow B. Accordingly, the output shaft 5 rotates in the direction indicated with the arrow C, which is the same direction of arrow A. The rotation speed coo of the output shaft 5 is a function of the rotation speed $\omega_i$ of the input shaft 3, depending on the transmission ratio of the compound star wheel shafts 412, namely on the radiuses of the first gear stage 4121, the second gear stage 4122, the input sun wheel 411, and the output star wheel 414. If the star carrier 413 rotates according to the direction indicated with the arrow D, namely, according to the same direction of the input shaft 3 of arrow A, the rotation speed $\omega_o$ of the output shaft 5 is increased. Instead, if the star carrier 413 rotates in the opposite direction of the arrow D, namely according to the direction E, then the rotation speed $\omega_o$ of the output shaft 5 is decreased. More specifically, over a rotation speed threshold the output shaft 5 can be zeroed and no torque transmitted to the load L.

Accordingly, if the output shaft 5 is blocked while the input shaft 3 rotates at a certain rotation speed $\omega_i$, the star carrier 413 will rotate in the direction according to arrow E.

The operation of the drive assembly 1 is coordinated by the control unit 7, which can be configured as Active Front-End Variable Frequency Drive. In some embodiments, the control unit 7 may be realized or implemented as a cloud computing system, a computer network, or other installations capable of processing data by running appropriate computer programs.

Figure 4:
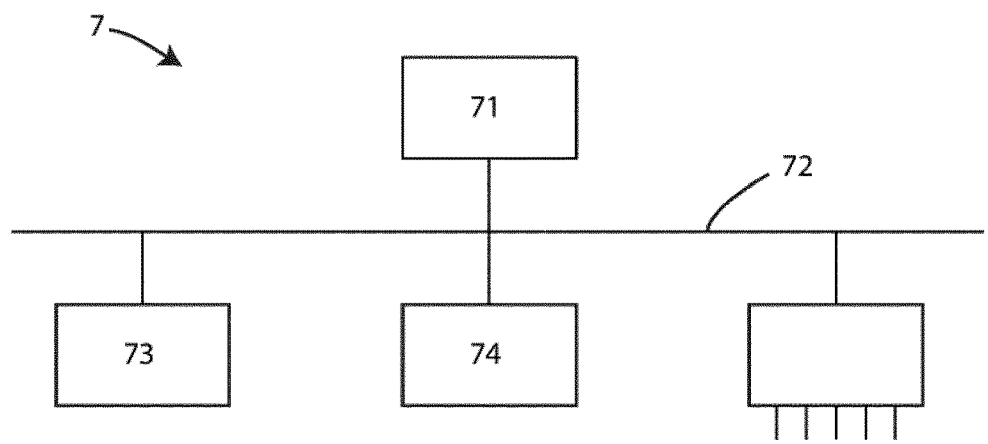
FIG. 4 illustrates an embodiment of a schematic of a control logic unit.

In some embodiments, and particularly referring to FIG. 4, the control unit 7 may comprise a processor 71, a bus 72, to which the processor 71 is connected to, a database 73, connected to the bus 72, so as to be accessed and controlled by the processor 71, a computer-readable memory 74, also connected to the bus 72, so as to be accessed and controlled by the processor 71, a receiving-transmitting module 75, connected to the bus 72, configured to receive the signals from the speed ratio motor-generator unit 42 and the power balance motor-generator unit 6, concerning their operation, and transmit control signals to the speed ratio motor-generator unit 42 and from the power balance motor-generator unit 6, for operating the same e coordinate the operation of the drive assembly 1 according to the possible different embodiments the drive assembly 1 can operate.

Based of the above, the operation of the drive assembly 1 is now described in different configurations, in order to better appreciate the performance and illustrate the operating method of the same. More specifically, the configuration of the drive assembly 1 according to FIG. 1 and the operating method better disclosed below can be adapted to any type of power source 2, regardless of whether it is capable of varying its speed, or not. This result is achieved by the control unit 7, which is configured to adapt the behavior of the hybrid gearbox 4 to the different circumstances.

The method of operating the train system T, and in particular, the drive assembly 1, allows the latter to operate both with single-shaft gas turbines or with any other fixed speed driver, like synchronous or induction electric motors, as power source 2, which, as known, cannot change the rotation speed, as well as with double-shaft gas turbines, steam turbines, expanders, VFD electric motors, diesel and gas engines as power source 2. The operating method of the drive assembly 1 is described in case of the power source 2 is a single-shaft gas turbine, and in case of the power source 2 is a double-shaft gas turbine or any variable speed driver, discussing the technical and design advantages in any of the cases.

If the power source 2 is a single-shaft gas turbine, the drive assembly 1 can start-up the gas turbine from stand-still condition up to its crank speed, and disconnect the load L during the gas turbine 2 acceleration phase from its crank speed to the gas turbine nominal speed (thus decoupling the load L from the power sources), then it will rump-up the load L to bring the driven equipment to its operating speed and finally regulate the driven equipment speed within its operative speed range.

By means of the drive assembly 1, and referring again to FIG. 1, during the start-up phase of a single-shaft gas turbine 2, the speed ratio motor-generator unit 42 acts first as a motor to rotate the star carrier 413 in the direction according to arrow E, and therefore, to bring, as said above, the gas turbine 2 to its crank speed.

Then the speed ratio motor-generator unit 42 is switched-off, so that the single-shaft gas turbine 2 can accelerate to reach its nominal speed without any resistant torque coming from the load L. In this phase the output shaft 5 is decoupled from the input shaft 3 (and then from the power source 2) so that the star carrier 413 is left free to spin (usually called "free spinning mode") and the torque transmitted to the load L is virtually zero.

In some embodiments, the output drive shaft 5 can be also blocked by means of the power balance motor-generator unit 6, which, as said, is controlled by the control unit 7. In this way, during the acceleration of the gas turbine 2, it is ensured that it is only the layshaft gearbox 41, and in particular, the rotation of the star carrier 413, able to compensate the speed increase of the gas turbine 2 and of the input shaft 3. In this configuration, the power balance motor-generator unit 6 allows the total control of torque transmission by the rotation of the star carrier 413.

The torque is then gradually transmitted to the load L by means of said control unit 7, which allows the rotation of the output shaft 5 by means of the speed ratio motor-generator unit 42. The speed ratio motor-generator unit 42 acts as generator and slow-down the star carrier 413 from its "free spinning mode". With the power source 2 at its nominal running speed any reduction of star carrier 413 speed from its "free spinning mode" will results in an increase of the output shaft 5 speed from stand-still condition (the power balance motor-generator unit 6 will be switched-off to keep the output shaft 5 free to rotate or act as an helper if requested). The star carrier 413 speed will be further reduced from its "free spinning mode" up to zero speed by the action of the speed ratio motor-generator unit 42, which continue to act as generator, and then the star carrier 413 speed will be increased in opposite rotation direction (in the direction according to arrow D of FIG. 1) by the action of the speed ratio motor-generator unit 42, which now act as motor, resulting this in a further increase of the output shaft 5 speed.

The layshaft gearbox 41 will be cinematically designed in order to bring the driven equipment to an operating point inside its operative speed range when the star carrier 413 speed is zero, so that the speed ratio motor-generator unit 42 will be able to regulate the driven equipment speed within its operative speed range, alternatively acting as generator, up to a maximum speed of the star carrier 413 in the direction according to arrow E, which will correspond to the driven equipment at minimum operative speed (MOS); or acting as motor up to a maximum speed in the direction according to arrow D, which will correspond to the driven equipment at maximum continuous speed (MCS).

Figure 5:
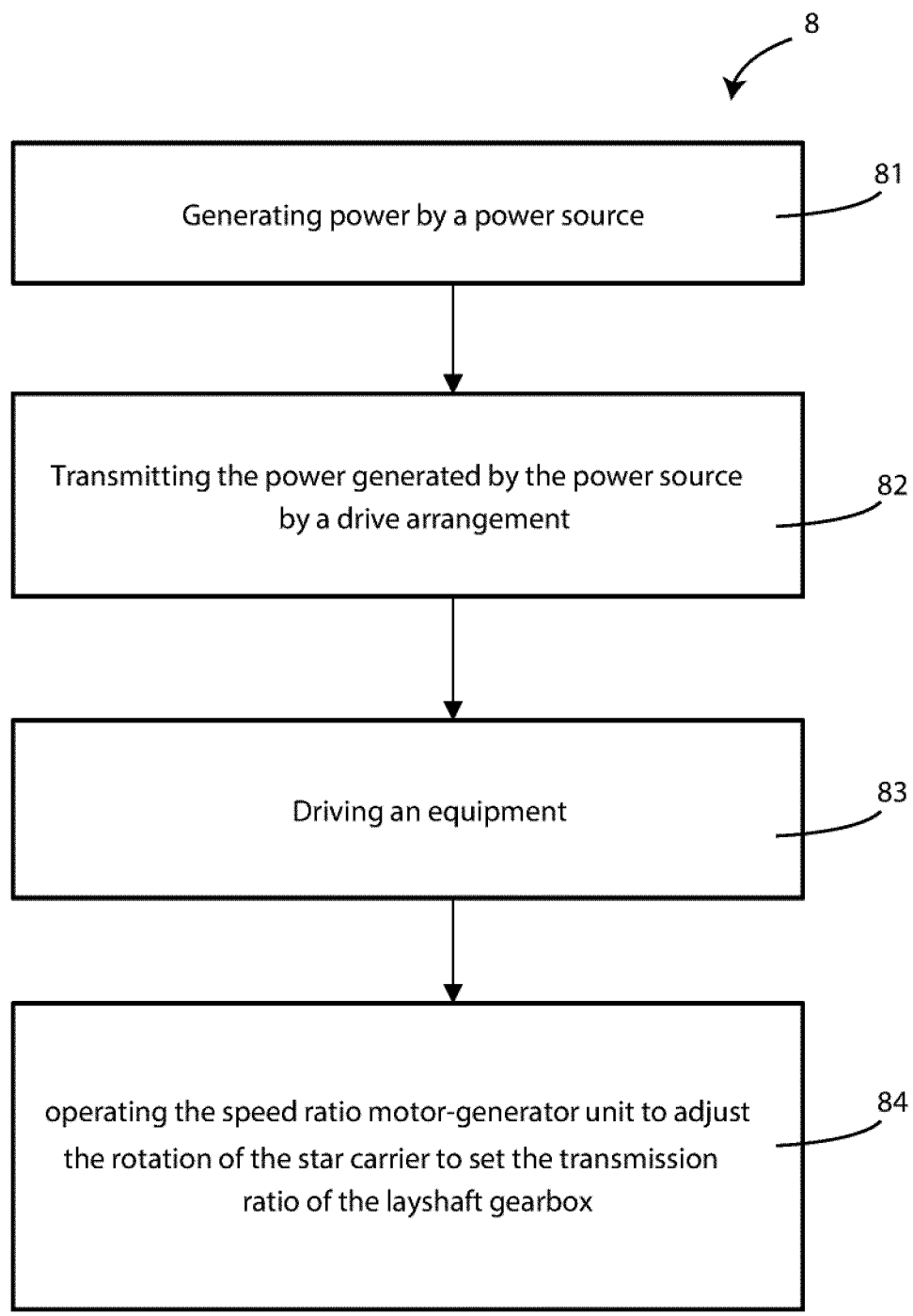
FIG. 5 illustrates a flowchart of the method for operating a train system according to the present disclosure.

Referring to FIG. 5, a flowchart of the method 8 for operating the train system T with a general power source 2 is shown. In particular, the method 8 comprises the steps of generating 81 power by a power source 2, thus rotating the input shaft 3, transmitting 82 the power generated by the power source 2 by the drive arrangement 1, and driving 83 the equipment L connected to the output shaft 5. The method 8 further comprises the step 84 of operating the speed ratio motor-generator unit 42, to adjust the rotation of the star carrier 413 to set the transmission ratio of the layshaft gearbox 41, to adjust the speed coo and the torque $C_o$ at the output shaft 5.

Figure 6:
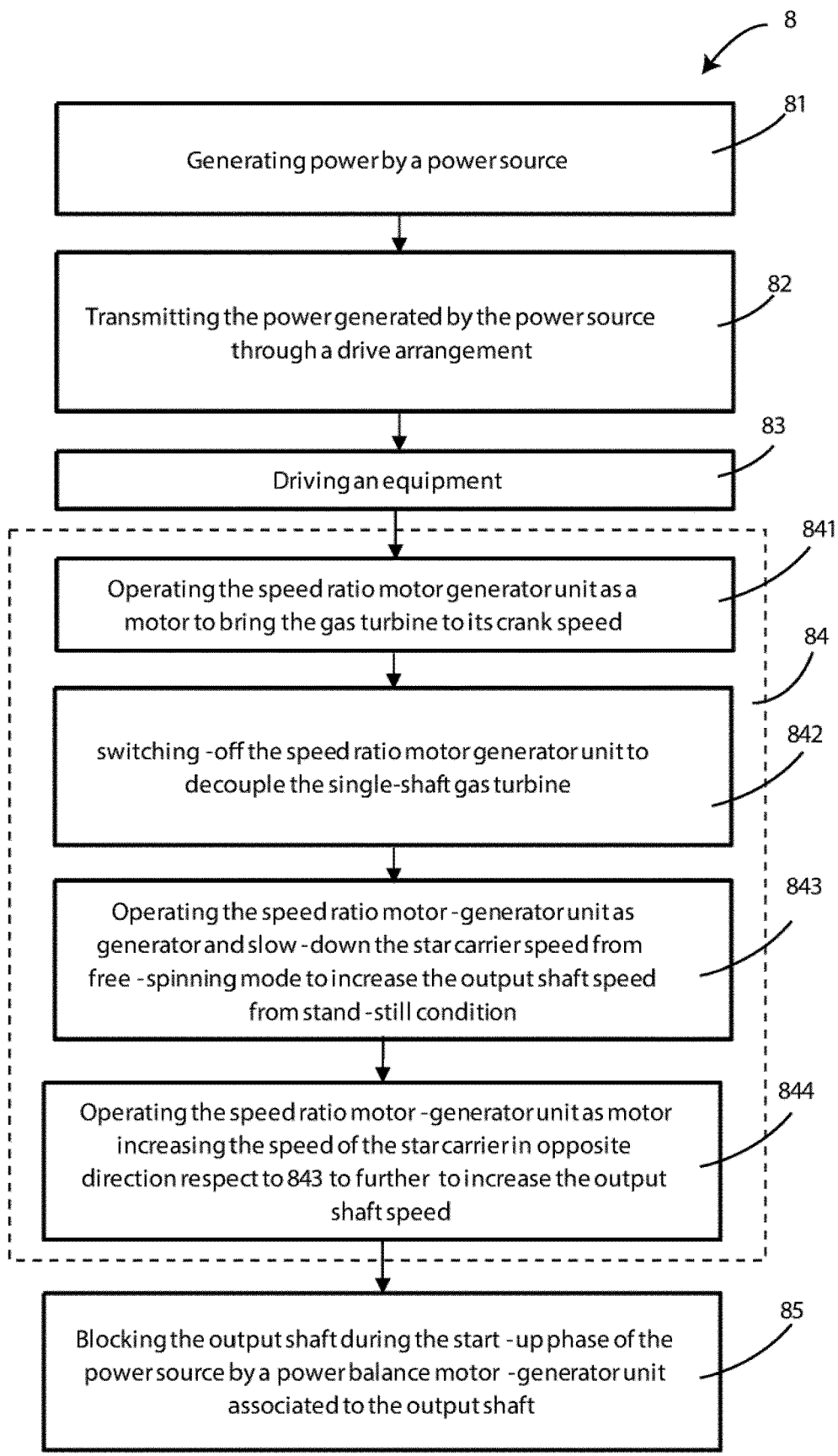
FIG. 6 illustrates a flowchart of the method for operating a train system including a single-shaft power turbine.

Referring to FIG. 6, the operating method 8 is shown in case of the power source is a single-shaft gas turbine 2, where it is just disclosed the start-up phase of such single-shaft gas turbine 2. The operating step 84 as already defined above, comprising the sub-steps of operating 841 the speed ratio motor generator unit 42 as a motor to bring the gas turbine 2 to its crank speed and then switching-off 842 the speed ratio motor generator unit 42 to decouple the single-shaft gas turbine 2 to accelerate and to reach its nominal speed, so that the star carrier 413 is free to spin. Then the speed ratio motor generator unit 42 is operated according to the sub-step 843 as generator and slow-down the star carrier 413, to increase the output shaft 5 speed from stand-still condition.

Also, the method 8 for operating the train system T further comprises the sub step of operating 844 the speed ratio motor-generator unit 42 as motor, to increase the speed of star carrier 413 in an opposite direction then the step 843, so as to further increase the speed of the output shaft 5.

Finally, a blocking step 85 of the output shaft 5 during the start-up phase of the power source 2 by a power balance motor-generator unit 6 associated to the output shaft 5 can be included.

The drive assembly 1 disclosed herein is capable of adapting its operation also in case of a double-shaft gas turbine as power source 2. In particular, in this case, a double-shaft gas turbine optimizes its efficiency when operates at the maximum power and speed. In this case, in fact, the corresponding pollution (in particular the emitted $CO_2$) is proportionally minimized per kilowatt (kW) generated. Therefore, operating the double-shaft gas turbine to the maximum power and speed, the rotational speed $\omega_i$ of the input shaft 3 is fixed. The output shaft 5 rotational speed $\omega_o$ can be adjusted by the star carrier 413 by means of the speed ratio motor-generator unit 42.

The power balance motor-generator unit 6 adjusts, by means of the control unit 7, the power absorbed by the load L, if operated as a generator, absorbing part of the torque transmitted to the output shaft 5. Therefore, part of the power generated by the power source 2 can be recovered by the power balance motor-generator unit 6 and transformed in electrical energy. The electrical energy generated by the power balance motor-generator unit 6 can be then either injected into the electricity grid N or injected into a battery system for future use, thus balancing the power to be transmitted to the load L and, at the same time, recovering the energy produced in excess by the power source 2.

Further, in case, for example, the load L requires additional power at different operating speed, the control unit 7 can either increase the speed output shaft 5 rotational speed $\omega_o$ by adjusting the rotation of the star carrier 413, and/or reduce the torque (and therefore the power) absorbed by the power balance motor-generator unit 6.

Further, in case, for example, the load L requires a different power at constant operating speed, the control unit 7 can adjust the torque (and therefore the power) absorbed by the power balance motor-generator unit 6, or deliver, if needed a net power to the output shaft 5, acting as motor, to compensate the overall power balance.

Figure 7:
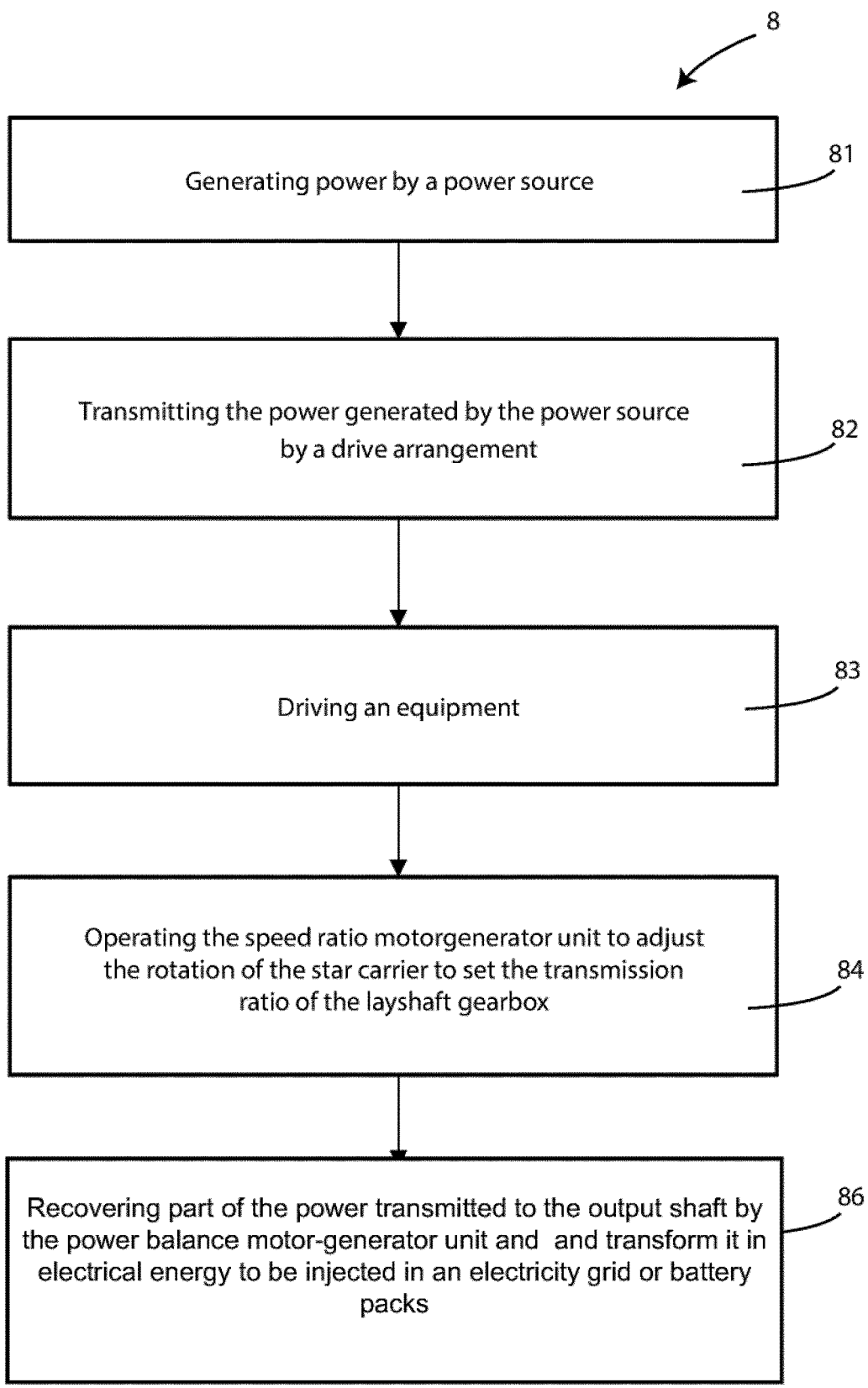
FIG. 7 illustrates a flowchart of the method for operating a train system including a double-shaft power turbine.

Referring to FIG. 7, a flowchart of the method 8 for operating the train system T with a double-shaft gas turbine 2 as power source is shown. The method 8, which can operate also with a single-shaft gas turbine, in addition to the above mentioned steps illustrated in FIG. 5 of generating 81 power by the gas turbine 2, transmitting 82 the power generated by the power source 2 by the drive arrangement 1, driving 83 the equipment L connected to the output shaft 5, and the step 84 of operating the speed ratio motor-generator unit 42, to adjust the rotation of the star carrier 413 to set the transmission ratio of the layshaft gearbox 41, also comprises the step of recovering 86 part of the power transmitted to the output shaft 5 and transforming it in electrical energy to be injected in an electricity grid or battery packs N the power balance motor-generator unit 6, operable as generator. In this way, as mentioned, the double shaft gas turbine 2 can operate at the maximum power and speed, namely at the maximum efficiency, enabling to minimize the $CO_2$ production per equivalent overall output and enabling to build spinning reserve by recovering part of the energy in excess from power source 2. In the same way, the single shaft gas turbine 2 can operate at the maximum power and its nominal speed, namely at the maximum efficiency, enabling to minimize the $CO_2$ production per equivalent overall output and enabling to build spinning reserve by recovering part of the energy in excess from power source 2.

Figure 8:
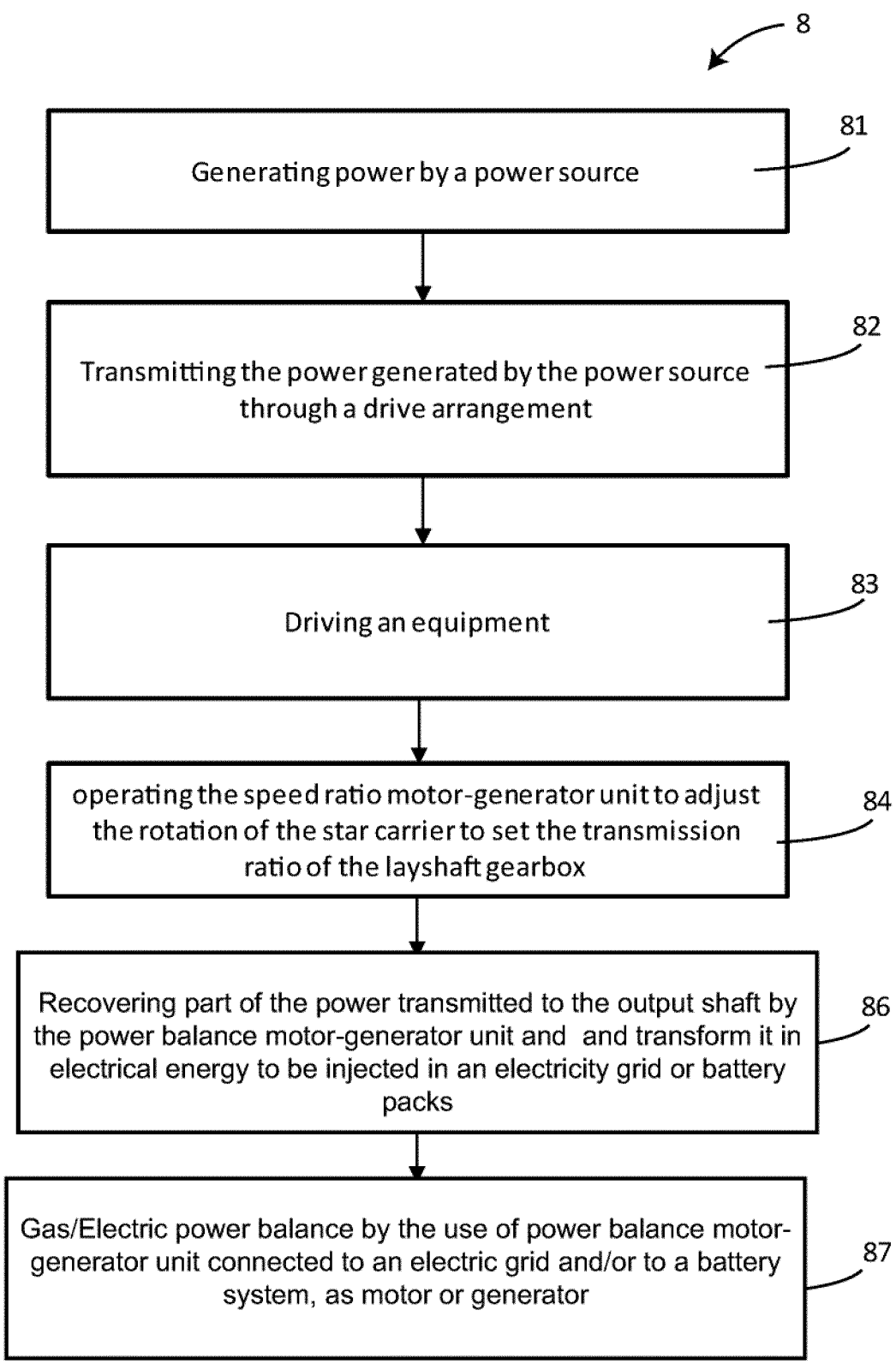
FIG. 8 illustrates a further flowchart of the method for operating a train system including a double-shaft power turbine.

Referring to FIG. 8, a flowchart of the method 8 for operating the train system T with a double-shaft or single-shaft gas turbine 2 as power source is also shown. The method 8, in addition to the above mentioned steps illustrated in FIG. 7 of generating 81 power by the gas turbine 2, transmitting 82 the power generated by the power source 2 by the drive arrangement 1, driving 83 the equipment L connected to the output shaft 5, and the step 84 of operating the speed ratio motor-generator unit 42, to adjust the rotation of the star carrier 413 to set the transmission speed ratio of the layshaft gearbox 41, also comprises the step of gas/electric power balance 87 by the use of power balance motor-generator unit 6, as motor or generator connected to an electric grid, respectively delivering power to the output shaft 5 or absorbing part of the power transmitted to the output shaft 5 by the power source 2, based on energy availability and cost or to cover gas turbines power surplus/deficit based on ambient conditions (winter/summer or night/day ambient temperature variation).

Referring to FIG. 8, a flowchart summarizing the method 8 for operating the train system T with a double-shaft or single-shaft gas turbine 2 as power source is shown. The method 8, in addition to the above mentioned steps illustrated in FIG. 5 of generating 81 power by the gas turbine 2, transmitting 82 the power generated by the power source 2 by the drive arrangement 1, driving 83 the equipment L connected to the output shaft 5, and the step 84 of operating the speed ratio motor-generator unit 42, to adjust the rotation of the star carrier 413 to set the transmission speed ratio of the layshaft gearbox 41, also comprises the step of Gas/Electric power balance 87 by the use of power balance motor-generator unit 6, as motor or generator, connected to a battery system, respectively delivering power to the output shaft 5 or absorbing part of the power transmitted to the output shaft 5 by the power source 2, thus enabling electric energy storage in battery systems to build spinning reserve and cover gas turbines power surplus/deficit based on ambient conditions (winter/summer or night/day ambient temperature variation).

In case of the drive source 2 is an electric motor, synchronous or induction electric motor, at the start it is necessary provide a peak power to overcome the inertia of the load L. This requires that the electric motor is oversized in terms of power, just to compensate for this power need in the start-up phase. This causes an increase in the cost of the component.

In case of the drive source 2 is a synchronous electric motor, its pulsating torque at the start-up will cross the train TNF's (typically the first and second train torsional frequencies), thus resulting in a heavy torque response, in resonance, which can limit the number of start-ups due to fatigue phenomena.

While aspects of the invention have been described in terms of various specific embodiments, it will be apparent to those of ordinary skill in the art that many modifications, changes, and omissions are possible without departing form the spirt and scope of the claims. In addition, unless specified otherwise herein, the order or sequence of any process or method steps may be varied or re-sequenced according to alternative embodiments.

Reference has been made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

When elements of various embodiments are introduced, the articles "a", "an", "the", and "said" are intended to mean that there are one or more of the elements. The terms "comprising", "including", and "having" are intended to be inclusive and mean that there may be additional elements other than the listed elements.

The invention claimed is:

1. A method for operating a train system, the train system comprising a power source, a drive arrangement comprising an input shaft connected to the power source, an output shaft, and a hybrid gear box having a layshaft gear box connected to the input shaft and the output shaft, a star carrier configured to adjust a transmission speed ratio of the layshaft gearbox between the input shaft and the output shaft, a speed ratio motor-generator unit configured to control the rotation of the star carrier, and a power balance motor-generator unit associated to the output shaft,
the method comprising the steps of:
transmitting power generated by the power source through the drive arrangement to a load connected to the output shaft;
operating the speed ratio motor-generator unit to adjust rotation of the star carrier from a free spinning mode to set a transmission speed ratio of the layshaft gearbox that corresponds with speed and the torque at the output shaft when the power source is operated at constant speed;
operating the power balance motor-generator unit to recover power transmitted to the output shaft and transform it into electrical energy; and
injecting the electrical energy into an electricity grid by a power balance motor-generator unit,
wherein the power balance motor-generator unit is operable as an electric motor to adjust speed and the torque of the output shaft,
wherein the power balance motor-generator unit is operable as a generator to absorb power transmitted to the output shaft and generate an electric current, and
wherein the speed ratio motor-generator unit and the power balance motor-generator unit are not operated at the same time with the star carrier in the free spinning mode.

2. The method of claim 1, wherein the power source is a double-shaft gas turbine.

3. The method of claim 1, further comprising the step of:
gas/electric power balance by using the power balance motor-generator unit, connected to a battery system, as a motor for delivering power to the output shaft,
wherein the battery system builds spinning reserve and covers power surplus or deficit based on ambient conditions.

4. The method of claim 1, further comprising the step of:
gas/electric power balance using the power balance motor-generator unit connected to an electric grid, as motor for delivering power to the output shaft to cover power surplus or deficit based on ambient conditions.

5. A computer program, comprising instructions which, when the program is executed by a computer, causes the computer to carry out the steps of operating the speed ratio motor-generator unit and the recovering of the method of claim 1.

6. A computer-readable storage medium, comprising the instructions which, when executed by a computer, cause the computer to carry out the steps of operating the speed ratio motor-generator unit and the recovering of the method of claim 1.

7. The method of claim 1, wherein the power source is an electric motor.

8. The method of claim 1, wherein the power source is a steam turbine.

9. The method of claim 1, wherein the power source is a single shaft gas turbine.

10. The method of claim 1, wherein the power source is a diesel engine.

11. The method of claim 1, wherein the power source is a gas engine.

12. The method of claim 1, further comprising the step of:
gas/electric power balance by using the power balance motor-generator unit, connected to a battery system, as a generator for absorbing part of the power transmitted to the output shaft by the power source,
wherein the battery system builds spinning reserve and covers power surplus or deficit based on ambient conditions.

13. The method of claim 1, further comprising the step of:
gas/electric power balance using the power balance motor-generator unit, connected to an electric grid, as a generator for absorbing part of the power transmitted to the output shaft by the power source, to cover power surplus or deficit based on ambient conditions.

* * * * *